United States Patent [19]
Collom et al.

[11] Patent Number: 5,271,886
[45] Date of Patent: Dec. 21, 1993

[54] PROCESS AND APPARATUS FOR RAPID PRE-EXPENSION AND MOLDING OF EXPANDABLE POLYMER PARTICLES

[75] Inventors: William Collom, Alburtis; Dennis Fuller, West Chester; Joseph Kinslow, Media; Bernard H. Meyer, Newtown Square; Richard H. Immel, West Chester, all of Pa.

[73] Assignee: Arco Chemical Technology, L.P., Wilmington, Del.

[21] Appl. No.: 960,757

[22] Filed: Oct. 14, 1992

[51] Int. Cl.$^5$ .............................................. B29C 67/22
[52] U.S. Cl. ........................................ 264/50; 264/51; 264/55; 264/DIG. 9; 264/DIG. 10
[58] Field of Search ................. 264/50, 51, 53, 55, 264/DIG. 9, DIG. 10

[56] References Cited

U.S. PATENT DOCUMENTS

| | | | |
|---|---|---|---|
| 2,714,747 | 8/1955 | Lindemann et al. | 264/50 |
| 2,714,748 | 8/1955 | Stirnemann et al. | 264/50 |
| 2,779,062 | 1/1957 | Stasny | 264/55 |
| 3,023,175 | 2/1962 | Rodman, Jr. | 264/DIG. 9 |
| 3,278,658 | 10/1966 | Immel | 264/51 |
| 3,280,472 | 10/1966 | Loranian | 34/10 |
| 3,436,445 | 4/1969 | Brunner et al. | 264/50 |
| 3,446,882 | 5/1969 | London | 264/45.4 |
| 3,666,850 | 5/1972 | Windeclar | 264/45.4 |
| 3,887,754 | 6/1975 | Walter | 264/53 |
| 4,032,609 | 6/1977 | Smith | 264/53 |
| 4,513,106 | 4/1985 | Edgren et al. | 521/58 |
| 4,752,625 | 6/1988 | Wu et al. | 521/139 |
| 5,049,328 | 9/1991 | Meyer et al. | 264/50 |

FOREIGN PATENT DOCUMENTS

| | | | |
|---|---|---|---|
| 3115625 | 10/1982 | Fed. Rep. of Germany | 264/50 |
| 3147160 | 6/1983 | Fed. Rep. of Germany | 264/50 |

*Primary Examiner*—Allan R. Kuhns
*Attorney, Agent, or Firm*—Jonathan L. Schuchardt

[57] ABSTRACT

A process and apparatus for rapidly expanding and molding carbon dioxide-impregnated polymer particles is disclosed. The process involves expanding the impregnated particles in a moving stream of pressurized saturated steam or super-heated steam, directing the resulting stream of pre-expanded particles into a mold, and molding the particles into a foamed object. Apparatus suitable for use with the process is also disclosed.

10 Claims, 1 Drawing Sheet

PROCESS AND APPARATUS FOR RAPID PRE-EXPENSION AND MOLDING OF EXPANDABLE POLYMER PARTICLES

FIELD OF THE INVENTION

The invention relates to processes for making molded foam objects from expandable thermoplastic polymer particles. In particular, the invention relates to a process and apparatus for rapidly pre-expanding and molding carbon dioxide-impregnated polymer particles.

BACKGROUND OF THE INVENTION

Molded polymer foams such as polystyrene are most commonly made commercially either by extruding a molten polymer that contains a blowing agent, or by expanding and molding polymer particles that contain a blowing agent. When polymer particles are used, the particles are typically impregnated with a hydrocarbon blowing agent such as pentane, then heated with saturated steam to give "pre-expanded" polymer particles, i.e., larger particles of lower density. The pre-expanded particles, commonly called "prepuff," must be aged for at least about two hours to allow the particles to mature. During the aging process, air permeates the particles, and the internal pressure of the particles gradually approaches atmospheric pressure. The pre-expanded particles are commonly stored in large vented bags during the aging process. A substantial amount of storage space is required and handling of the bags is cumbersome. In addition, the need to age the particles wastes valuable time. A desirable process would eliminate the need for storage of pre-expanded beads, and would allow beads to be molded immediately following pre-expansion.

U.S. Pat. No. 3,666,850 teaches a method and apparatus for heating expandable polymer particles in a gun, and using a stream of hot air to soften and convey the particles to a zone in which the particles can expand and fuse to produce a foamed mass around an object to be packaged. The process permits encapsulation of electronic parts in a moisture-free protective foam.

U.S. Pat. No. 3,278,658 teaches a process for making a foamed thermoplastic article by heating pre-expanded polymer particles with hot air to soften the particles, transferring the particles to the desired molding zone, and subjecting the particles to a vacuum so that they expand to fill the space and fuse together.

U.S. Pat. No. 5,049,328 teaches a method of purifying, impregnating, and molding polymer particles with carbon dioxide. Low molecular weight impurities are advantageously removed from the polymer particles by extraction, especially with supercritical carbon dioxide. Because carbon dioxide rapidly diffuses from the polymer particles, $CO_2$-impregnated particles cannot be stored except under pressure for any long period.

Still needed in the art is a process for making polymer foams from expandable particles that eliminates the need to store and age an intermediate pre-expanded product. Preferably, the process could use expandable particles that have been purified and/or impregnated with carbon dioxide to eliminate the need for flammable hydrocarbons or ozone-depleting chlorofluorocarbons as blowing agents.

SUMMARY OF THE INVENTION

Objects of the invention: (1) a rapid process for expanding and molding expandable polymer particles; (2) a process that eliminates the need to store and age pre-expanded particles; (3) a process that can convert $CO_2$-impregnated expandable polymer particles directly to foamed articles; (4) a rapid process for making polystyrene foamed articles directly from expandable polystyrene beads; (5) apparatus useful for performing the processes of objects 1-4.

The invention is a rapid process for producing a molded foam object. The process comprises (a) rapidly expanding carbon dioxide-impregnated polymer particles in a moving stream that contains the particles and a heating fluid selected from the group consisting of pressurized saturated steam and super-heated steam; (b) directing the resulting moving stream of pre-expanded polymer particles and heating fluid into a mold; and (c) immediately molding the pre-expanded particles to produce a molded foam object.

The invention also includes apparatus for producing a molded foam object from carbon dioxide-impregnated polymer particles. The apparatus comprises (a) a source of a moving heating fluid; (b) a pre-expansion unit having an inlet for a moving stream of heating fluid, a heated and thermally insulated expanding pathway through which the carbon dioxide-impregnated polymer particles and the moving heating fluid may flow, and an outlet for pre-expanded polymer particles and heating fluid; and (c) a molding machine connected directly to the outlet of the pre-expansion unit.

DETAILED DESCRIPTION OF THE INVENTION

Figure 1:
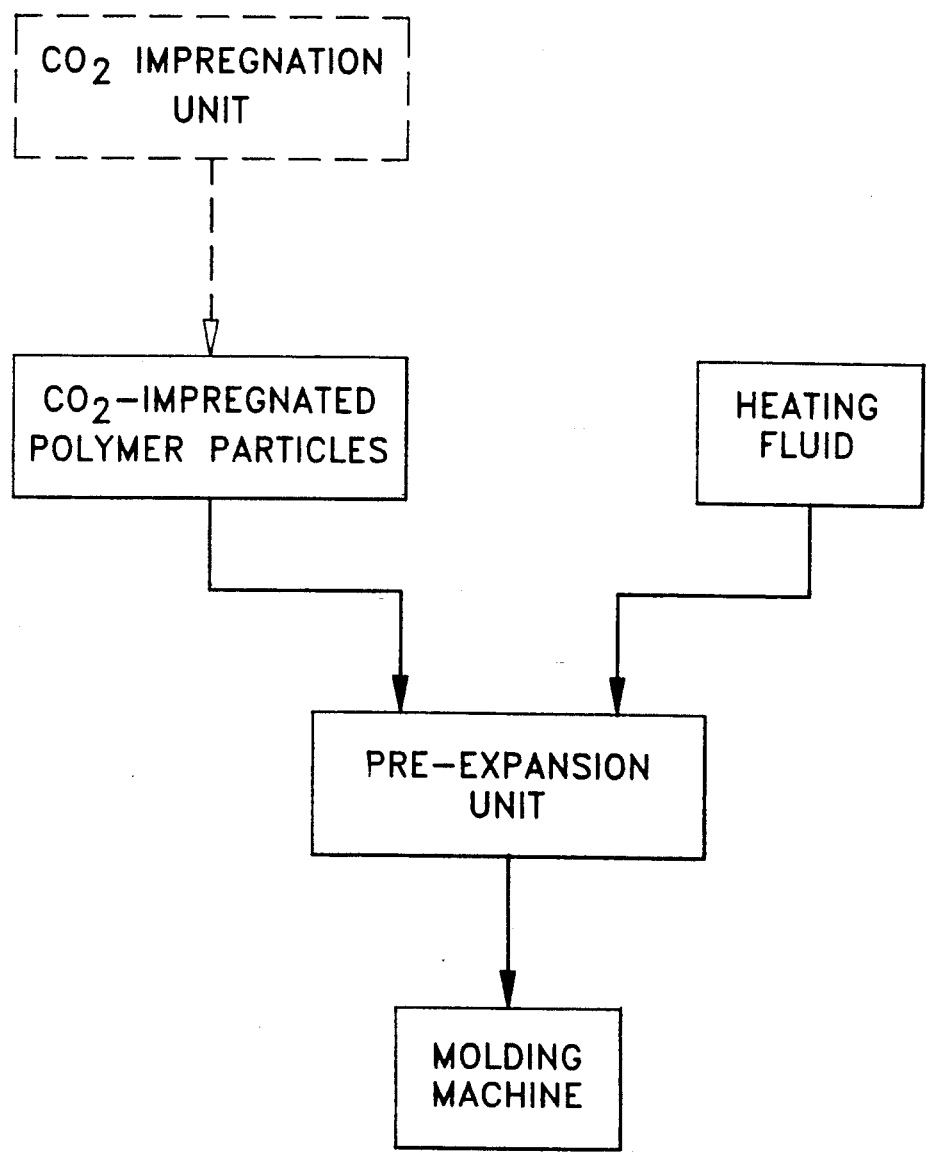
FIG. 1 is a schematic that shows the key elements of the apparatus of the invention. The elements include a source of carbon dioxide-impregnated polymer particles, a source of a heating fluid, a pre-expansion unit, and a molding machine. Optionally, a $CO_2$-impregnation unit is included.

The invention is a rapid process for producing a molded foam object from expandable polymer particles.

Polymers suitable for use in the process of the invention are thermoplastic polymers. The polymers must be in particulate or bead form, or be convertable to particulate form. Suitable polymers for use in the invention include, but are not limited to, polystyrene, styrene copolymers, polyphenylene oxide, polystyrene-polyphenylene oxide blends, polyoxymethylene, poly(methyl methacrylate), methyl methacrylate copolymers, polyethylene, polypropylene, ethylene-propylene copolymers, polyvinyl chloride, polycarbonate, polyethylene terephthalate, crosslinked variations thereof, rubber-modified versions thereof, blends thereof, and interpenetrating networks thereof. Particularly preferred are polystyrene and styrenic copolymers.

The polymer particles of the invention are impregnated with carbon dioxide. The particles can be impregnated with carbon dioxide in any desired manner. If desired, the particles can be confined in a sealed vessel and pressurized with liquid gaseous, or supercritical carbon dioxide. Another way to impregnate the polymer particles is to simply expose them to dry ice until sufficient carbon dioxide is absorbed by the particles. Although less preferred, it is also possible to use mixtures of carbon dioxide and hydrocarbons to impregnate the polymer particles. It is also possible and desirable at times to purify the polymer particles by extracting them with liquid or supercritical carbon dioxide, as is disclosed in U.S. Pat. No. 5,049,328. The resulting purified polymer particles, which are impregnated with carbon dioxide in the process, are well suited for use in the process of the present invention. The teachings of U.S. Pat. No. 5,049,328 are incorporated herein by reference in their entirety.

The carbon dioxide-impregnated particles are rapidly expanded by heating them in a moving stream containing the particles and a heating fluid selected from pressurized saturated steam and super-heated steam. The choice of steam rather than other alternatives such as, for example, hot air, is rather important. Successful, rapid molding of foamed objects is not easily achieved with hot air because hot air does not heat the particles efficiently enough. The better heat-transfer characteristics of steam compared to hot air promote complete expansion and good fusion of the particles in the rapid molding process. Superheated steam maintained at a temperature within the range of about 250° F. to about 500° F. is preferred.

Optionally, the heating fluid stream includes an inert gaseous diluent. Suitable gaseous diluents include, but are not limited to, air, carbon dioxide, nitrogen, argon, and the like, and mixtures thereof. The diluents are preferably avoided, however, because they reduce the heat-transfer efficiency of the heating fluid stream.

The moving stream of steam and pre-expanded polymer particles is directed into a mold in any desired manner. When the mold is filled with the desired amount of pre-expanded beads, the mold is closed, and the product is molded in the conventional manner. It is often preferred, as when a brick mold is used, to inject the moving stream of steam and pre-expanded polymer particles from the bottom of the mold in a generally upward direction to permit enhanced mixing of the expanded beads in the mold. Foamed objects having improved density potential generally result when a bottom-filling approach is used.

The pre-expanded polymer particles are immediately molded into a foamed object using a conventional molding machine. Foamed objects are molded under pressure in the presence of steam using any of a number of methods and apparatus that are well known to those skilled in the art.

The invention includes apparatus for producing a molded foam object from carbon dioxide-impregnated polymer particles. The apparatus includes a pre-expansion unit and a molding machine connected directly to the pre-expansion unit. The molding machine is any conventional molding machine used for molding thermoplastics.

The pre-expansion unit includes an inlet for carbon dioxide-impregnated polymer particles, an inlet for a moving stream of a heating fluid, a heated and thermally insulated expanding pathway through which the impregnated polymer particles and moving heating fluid may flow, and an outlet for pre-expanded polymer particles and heating fluid. A suitable pre-expansion unit can be made by modifying a conventional fill gu as follows. The gun is lengthened to increase the residence time of the particles, and is heated and well insulated. The gu is also modified to permit the introduction of a heating fluid such as super-heated steam.

As shown in Example 2 below, the pre-expansion unit can consist of a heated and well-insulated pipe having inlets for the expandable polymer particles and heating fluid, and an outlet for the pre-expanded product. Any desired pre-expander shape or design can be used.

Optionally, the pre-expansion unit includes one or more augers, baffles, or static mixers. The type and number of these can be varied to control the residence time of the expandable polymer particles within the pre-expansion unit. Typically, increased residence time will permit the preparation of pre-expanded polymer particles of minimum density.

The apparatus of the invention includes a source of a moving heating fluid selected from the group consisting of pressurized saturated steam and super-heated steam. Any conventional steam generator can be used. Super-heated steam can be obtained by using a heat exchanger as an external heat source. The moving heating fluid will generally be charged to the pre-expansion unit at a temperature within the range of about 250° F. to about 500° F. Preferably, super-heated steam at a temperature within the range of about 350° F. to about 500° F. is charged to the pre-expansion unit.

The apparatus of the invention preferably includes a rapid steam shut-off valve between the pre-expansion unit and the molding machine. The presence of such a valve prevents excessive exposure of the foam to steam and possible foam shrinkage as an undesirable result of exposure.

The apparatus of the invention optionally includes an additional unit for impregnating polymer particles with carbon dioxide. The impregnation unit consists of a pressure vessel in which polymer particles are stored and impregnated, and a source of liquid or gaseous carbon dioxide. Typically, the particles are charged to the vessel, and the vessel is pressurized with carbon dioxide for a time sufficient to impregnate the polymer particles with carbon dioxide. The optional impregnation unit is connected directly to the pre-expansion unit, so that the $CO_2$-impregnated polymer particles can be discharged directly into the the moving stream of heating fluid in the pre-expansion unit. This technique is illustrated in Example 2. The impregnation unit can also be set up to both purify and impregnate the polymer beads using a continuous-extraction process with liquid or supercritical carbon dioxide, as is taught in U.S. Pat. No. 5,049,328.

The impregnation unit is optional. If desired, one can simply introduce polymer particles that have been exposed to dry ice directly into the pre-expansion unit. This technique is used for Example 1.

Advantages of the process and apparatus of the invention over previously known techniques for making molded foam objects are numerous. First, the process is rapid. Expandable polymer particles can be pre-expanded and molded in five minutes or less. In contrast, conventional approaches require a 2-hour aging of the pre-expanded product before molding is performed. Eliminating this aging step saves time and money.

Second, the use of carbon dioxide (which can be recovered from the atmosphere and reused) eliminates concerns about high flammability (hydrocarbons), toxicity (halogenated hydrocarbons), and ozone depletion (chlorofluorocarbons).

Third, the invention eliminates the need for cumbersome handling and storage of large quantities of pre-expanded polymer particles.

Fourth, the invention is well-suited for use in combination with a polymer purification process using carbon dioxide, so molded products that are practically free of low molecular weight impurities can be made. This is especially useful for foamed objects such as drinking cups, for which high product purity is an added bonus.

The following examples merely illustrate the invention. Those skilled in the art will recognize numerous variations that are within the spirit of the invention and scope of the claims.

EXAMPLE 1

Pre-expansion and Molding of $CO_2$-Impregnated Polystyrene Beads

A conventional molding process uses a "fill gun" to transfer pre-expanded polystyrene beads to a mold. In this example, the conventional fill gun is modified to allow steam injection into the fill gun. This modification permits the use of unexpanded, carbon dioxide-impregnated polymer beads as a feedstock instead of pre-expanded beads.

Unexpanded, carbonated polystyrene beads (1 mm diameter, 2–12 wt.% $CO_2$ content, $M_w=200,000$) are fed to a fill gun that is modified for steam injection. The beads are exposed to steam (35 psig) in the fill gun and are immediately transferred into a molding machine (EPM Equipment Co.) fitted with a brick mold. The mold is drilled out to allow bottom feeding of the expanded beads into the mold, which improves agitation of the beads in the mold during expansion. Molding conditions: 35 psig steam pressure (280° F.); 35 seconds pre-steaming of the mold; 35 psig/10 seconds (fusion). Ten polystyrene bricks having acceptable fusion and densities within the range of about 2.7 to 3.0 pcf are produced.

In comparison, when an ordinary fill gun (air; not modified to inject steam) is used with carbonated polystyrene particles in the same process, the resulting bricks have densities of about 4.4 pcf.

EXAMPLE 2

$CO_2$ Impregnation and Pre-expansion of Polystyrene Beads using an In-line (Pipe) Expander This example shows how an in-line expander can be used to rapidly convert carbon dioxide-impregnated polystyrene beads to give pre-expanded beads. The pre-expanded beads can be fed directly to a molding machine and molded as shown in Example 1. In this example, the pre-expanded beads are not molded. The example simply illustrates another way of rapidly expanding $CO_2$-impregnated particles.

Polystyrene beads (not carbonated, about 100 g) are charged to a 2.2 liter stainless steel pressure vessel, and the vessel is pressurized with carbon dioxide (800 psig) for 15 minutes to impregnate $CO_2$.

The pre-expansion unit consists of a heated and well-insulated pipe that is pre-heated with a constant flow of super-heated steam so that the temperature inside the pipe is within the range of about 300–500° F. The steam pressure at the pre-expander inlet is regulated to about 22.5 psig. The steam is super-heated before introducing it into the pre-expansion unit using a 2.0 kilowatt steam super-heater. The steam enters the super-heater at about 263° F., and exits at a temperature within the range of about 380–470° F.

The carbon dioxide-impregnated beads are discharged at 0 psig from the impregnation unit directly into the pipe pre-expansion unit into the moving stream of super-heated steam. Pre-expanded beads exit the pre-expansion unit, and are collected in a storage bin, although they could be fed directly into a molding machine.

The pre-expanded beads have densities within the range of about 7–8 pcf. When the pipe pre-expansion unit is modified to include 4 baffles to increase residence time of the beads inside the pre-expansion unit, pre-expanded beads having a density of about 5 pcf are produced.

The preceding examples are meant only as illustrations. The true metes and bounds of the invention are defined by the following claims.

We claim:

1. A rapid process for producing a molded foam object, said process comprising:
    (a) rapidly expanding carbon dioxide-impregnated polymer particles in a moving stream that contains the particles and a heating fluid selected from the group consisting of pressurized saturated steam and super-heated steam;
    (b) immediately directing the resulting moving stream of pre-expanded polymer particles and heating fluid into a mold; and
    (c) immediately molding the pre-expanded particles to produce a molded foam object.

2. The process of claim 1 wherein the polymer particles are particles of a polymer selected from the group consisting of polystyrene, styrene copolymers, polyphenylene oxide, polystyrene-polyphenylene oxide blends, polyoxymethylene, poly(methyl methacrylate), methyl methacrylate copolymers, polyethylene, polypropylene, ethylene-propylene copolymers, polyvinyl chloride, polycarbonate, polyethylene terephthalate, crosslinked variations thereof, rubber-modified versions thereof, blends thereof, and interpenetrating networks thereof.

3. The process of claim 1 wherein the polymer particles are polystyrene particles.

4. The process of claim 1 wherein the heating fluid is super-heated steam maintained at a temperature within the range of about 250° F. to about 500° F.

5. The process of claim 1 wherein the heating fluid stream includes an gaseous diluent selected from the group consisting of air, nitrogen, carbon dioxide, and argon.

6. A rapid process for producing a molded foam object, said process comprising:
    (a) rapidly expanding carbon dioxide-impregnated polymer particles in a moving stream that contains the particles and a heating fluid selected from the group consisting of pressurized saturated steam and super-heated steam;
    (b) immediately directing the resulting moving stream of pre-expanded polymer particles and heating fluid into a mold; and
    (c) immediately molding the pre-expanded particles to produce a molded foam object;
    wherein the polymer particles are particles of a polymer selected from the group consisting of polystyrene, styrene copolymers, polyphenylene oxide, polystyrene-polyphenylene oxide blends, polyoxymethylene, poly(methyl methacrylate), methyl methacrylate copolymers, polyethylene, polypropylene, ethylenepropylene copolymers, polyvinyl chloride, polycarbonate, polyethylene terephthalate, crosslinked variations thereof, rubber-modified versions thereof, blends thereof, and interpenetrating networks thereof.

7. The process of claim 6 wherein the polymer particles are polystyrene particles.

8. The process of claim 6 wherein the heating fluid is super-heated steam maintained at a temperature within the range of about 250° F. to about 500° F.

9. The process of claim 6 wherein the heating fluid stream includes an gaseous diluent selected from the group consisting of air, nitrogen, carbon dioxide, and argon.

10. A rapid process for producing a molded polystyrene foam object, said process comprising:
 (a) rapidly expanding carbon dioxide-impregnated polystyrene particles in a moving stream that contains the particles and a heating fluid selected from the group consisting of pressurized saturated steam and super-heated steam;
 (b) immediately directing the resulting moving stream of pre-expanded polystyrene particles and heating fluid into a mold; and
 (c) immediately molding the pre-expanded polystyrene particles to produce a molded polystyrene foam object.

* * * * *